United States Patent
Brogan et al.

(10) Patent No.: US 6,182,242 B1
(45) Date of Patent: Jan. 30, 2001

(54) GENERIC DEVICE DRIVER SIMULATOR AND METHOD

(75) Inventors: James Jules Brogan, Pomerene; Bryan John Wright, Tucson, both of AZ (US)

(73) Assignee: International Business Machines Corporation, Armonk, NY (US)

(*) Notice: Under 35 U.S.C. 154(b), the term of this patent shall be extended for 0 days.

(21) Appl. No.: 09/071,062

(22) Filed: Apr. 22, 1998

(51) Int. Cl.$^7$ .................................................. G06F 11/00
(52) U.S. Cl. ............................................. 714/26; 703/22
(58) Field of Search ............................ 714/26; 709/300, 709/301, 302, 1; 395/500.42, 500.45, 500.46, 500.43, 43; 703/22

(56) References Cited

U.S. PATENT DOCUMENTS

| | | | |
|---|---|---|---|
| 4,718,064 | * | 1/1988 | Edwards .................................. 703/24 |
| 5,337,412 | | 8/1994 | Baker et al. ............................. 709/1 |
| 5,390,301 | | 2/1995 | Scherf .................................... 709/300 |
| 5,465,364 | | 11/1995 | Lathrop et al. ......................... 709/301 |
| 5,499,378 | | 3/1996 | McNeill, Jr. et al. .......... 395/500.45 |
| 5,586,324 | | 12/1996 | Sato et al. ............................... 713/2 |
| 5,949,993 | * | 9/1999 | Fritz ........................................ 703/23 |

OTHER PUBLICATIONS

IBM® Technical Disclosure Bulletin, "Definition of Vendor Specific Device Driver Interface," 38(03):357–358 (Mar. 1995).

IBM® Technical Disclosure Bulletin, "Device Driver Test Tool," 38(10):263–267 (Oct. 1995).

IBM® Technical Disclosure Bulletin, "Generic Device Driver for Personal Computer Removable Devices," 37(01):487–489 (Jan. 1994).

IBM® Technical Disclosure Bulletin, "OS/2 Virtual Device Driver Support for CD–ROM," 37(10):441–444 (Oct. 1994).

* cited by examiner

*Primary Examiner*—Robert W. Beausoliel, Jr.
*Assistant Examiner*—Bryce Bonzo
(74) *Attorney, Agent, or Firm*—Altera Law Group, LLC

(57) ABSTRACT

A generic device driver simulator having the knowledge of the device specific behavior moved out of simulator program code is disclosed. The generic device driver simulator includes a generic device driver for supporting application functions without device specific coding included therein, a database including device specific models of device drivers supported by the generic device driver and an interpreter for controlling the generic device driver according to the definitions of functions and data structures in the database. The generic device driver simulator also includes a watcher for defining watchpoints, the watchpoints identifying types of calls from the application. The watcher displays information when a watchpoint is triggered by a call from the application. The interpreter includes an input script for each device function or for multiple device functions that are supported by the generic device driver. The watcher supports the execution of an input script in the interpreter in response to a watchpoint being triggered.

40 Claims, 5 Drawing Sheets

Fig. 2

| Table: Sample Supported Function and Subfunction Database Record Definitions | | |
|---|---|---|
| Attributes 204 | Description 206 | Example |
| Device Name 212 | Device that supports this function | rmt 214 |
| FuncName 222 | Name of the supported function | ioctl 224 |
| SubFuncs 232 | Does this function contain subfunctions? | yes 234 |
| StructName 242 | Structure used with this function if any | N/A 244 |
| DevDesc 252 | Description of this device | Removable magnetic tape device 254 |
| FuncDesc 262 | Description of this function | Input/Output Control entry point 264 |
| SubFuncName 272 | Name of the supported subfunction | sioc_inquiry 274 |
| SubFuncNumber 282 | Number of this subfunction | 1082082049 284 |
| StructName 292 | Structure used with this subfunction | inquiry_data 294 |
| SubFuncDesc | Description of this subfunction | Return the inquiry data for this device 297 |

Table: Part of the interpreter's command set

| Command | Description |
|---|---|
| PRESET | Set, list, or clear preset functions responses |
| EXEC | Execute a command input file. |
| WATCH | Set, list, or clear, watch points. |
| IF | Conditional construct. |
| WHILE | Looping construct. |
| INT | Declare and initialize an integer variable. |
| CHAR | Declare and initialize a character variable. |
| STRUCT | Declare and initialize a structure variable. |
| STATIC | Declare static variables. |

Fig. 4

GENERIC DEVICE DRIVER SIMULATOR AND METHOD

BACKGROUND OF THE INVENTION

1. Field of the Invention

This invention relates in general to a application verification, and more particularly to a generic device driver simulator for aiding in the development of applications.

2. Description of Related Art

An operating system executes on the various microprocessors, and serves as the interface between the various application programs and the hardware of the computer system. The operating system communicates with the various peripheral devices via input/output (I/O) control programs referred to as device drivers. A device driver acts as an interface between the operating system and the corresponding peripheral device. The device driver provides control commands to activate the peripheral device and to check the device status to determine when it is ready for a data transfer. The device driver also performs error checking when transfers are occurring to ensure that the transfer has completed successfully. Further, the device driver responds when the peripheral device indicates completion of the control commands.

To write a device driver program, a detailed knowledge of the peripheral device is required. Consequently, device drivers are typically provided by manufacturers of the peripheral device. In many instances, the actual peripheral device hardware may not be available while the device driver is being developed by the manufacturer. As a result, actual testing and any debugging changes that need to be made must wait until the actual hardware becomes available. However, this increases the development time for the application software.

It is possible to develop device specific simulators. However, developing and maintaining a device specific simulator can be cost prohibitive. The simulator is often as complex as the device itself because it encapsulates all knowledge of the device behavior. This results in high initial development cost, high maintenance cost, and difficulty keeping simulation in sync with real device.

It can be seen then that there is a need for a generic device driver simulator.

It can also be seen then that there is a need for a device driver simulator that has the knowledge of the device specific behavior moved out of simulator program code.

SUMMARY OF THE INVENTION

To overcome the limitations in the prior art described above, and to overcome other limitations that will become apparent upon reading and understanding the present specification, the present invention discloses a generic device driver simulator.

The present invention solves the above-described problems by moving the knowledge of the device specific behavior out of simulator program code.

A system in accordance with the principles of the present invention includes a generic device driver for supporting application functions without device specific coding included therein, a database including device specific models of device drivers supported by the generic device driver and an interpreter for controlling the generic device driver according to the definitions of functions and data structures in the database.

Other embodiments of a system in accordance with the principles of the invention may include alternative or optional additional aspects. One such aspect of the present invention is that the generic device driver simulator further includes a watcher for defining watchpoints, the watchpoints identifying types of calls from the application.

Another aspect of the present invention is that the watcher displays information when a watchpoint is triggered by a call from the application.

Another aspect of the present invention is that the interpreter further comprises an input script for each device function supported by the generic device driver.

Another aspect of the present invention is that the interpreter further comprises an input script for multiple device functions supported by the generic device driver.

Another aspect of the present invention is that the watcher supports the execution of an input script in the interpreter in response to a watchpoint being triggered.

Still another aspect of the present invention is that the device specific models further includes definitions of functions executed by the application and data structures.

Another aspect of the present invention is that the generic device driver simulator further includes response queues for each function executed by the application.

Another aspect of the present invention is that the response queues are specific to a function.

Another aspect of the present invention is that the response queues return the next response to the application in response to receipt of a signal from the application.

Yet another aspect of the present invention is that the response queues return the next response to the application in response to receipt of a signal from the application.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 is one example of a database table 200 illustrating some fields necessary to describe a device;

FIG. 4 illustrates a table for one example of an interpreter command set according to the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a generic device driver simulator for aiding in the development of application programs. The generic device driver simulator moves the knowledge of the device specific behavior out of simulator program code. A database is used to define the functions and the data structures supported by the device and an interpreter is used to program the simulator based on the information obtained from the database. A watcher provides a user environment application that allows an application to monitor calls made to a simulated device.

Figure 1:
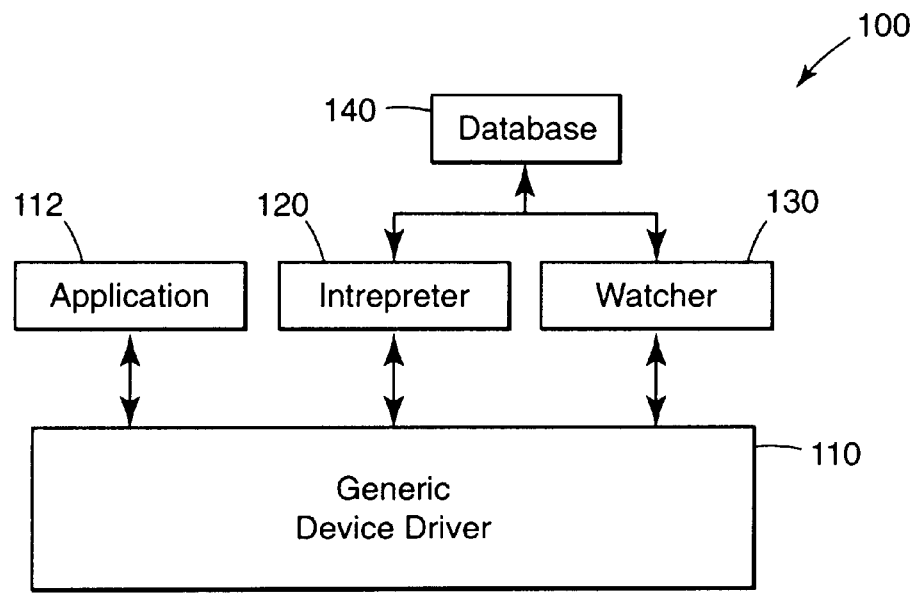
FIG. 1 illustrates a block diagram of the generic device driver simulator according to the present invention.

FIG. 1 illustrates a block diagram of the generic device driver simulator 100 according to the present invention. In FIG. 1, the generic device driver simulator includes a generic device driver 110. The generic device driver 110 is a top half only device driver that executes in the kernel environment. By default, the generic device driver 110 returns "GOOD" status for each function called by the application 112. The generic device driver simulator also includes an interpreter 120, a watcher 130 and a database 140. The knowledge of the device specific behavior is moved out of code for the generic device driver 110. The database 140 is used to define the functions and the data structures supported by the generic device driver 110. The interpreter 120 is used to program the generic device driver simulator 100 based on the information obtained from the database 140. The watcher 130 is a user environment application that allows the developer of the application 112 to monitor the calls made to a simulated device. The database 140 allows the device driver to be generic, by providing a device specific model containing knowledge of each device of the generic device driver 110.

FIG. 2 is one example of a databases table 200 illustrating some fields necessary to describe a device. In the case for FIG. 2, the model is for a tape device. The table 200 includes attributes 202, a description 204 and an example 206 for a tape device. For example, the DeviceName 210 is one attribute and it is for a device that supports this function 212. In FIG. 2, the DeviceName is rmt 214. The FuncName 220 is the name of the function supported by the tape device 222 and is ioctl 224. The SubFuncs 230 identifies whether this function contains subfunctions 232. In the case for the tape device, the function does contain subfunctions 234.

StructName 240 is the name for the structure used for this function 242. No structure is applicable to this function 244. DevDesc 250 is the name for the description of this device 252, which is Removable Magnetic Tape Device 254 for this example. FuncDesc 260 is the name for the description of the function 262, which is Input/Output Control entry point 264 for this example. SubFuncName 270 is the name of the supported subfunction 272. The supported subfunction 272 for the tape device is sioc_inquiry 274 for this example. SubFuncNumber 280 is the number for this subfunction 282, which is "1082082049" 284 in this example. StructName 290 is the name for the structure used with this subfunction 292, which is inquiry_data 294 in this example. Finally, SubFuncDesc 296 is the name of the description for this subfunction 298, which is "Return the inquiry data" 299 for this device in this example. Thus, the application developer can control the behavior of a device being simulated without changing/compiling any simulator program code. The application developer can simulate another device simply by installing or creating a database describing the device.

Figure 3:
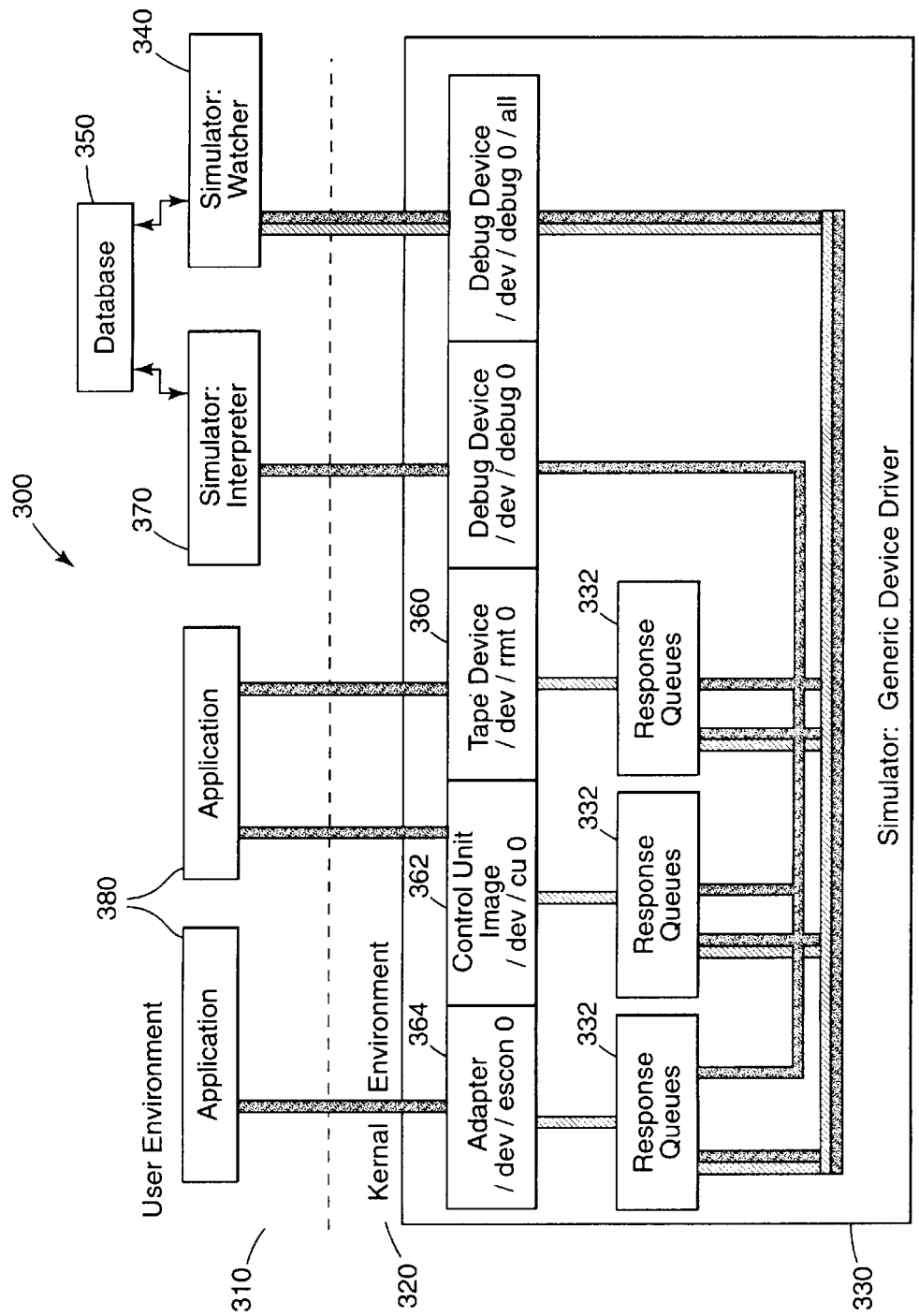
FIG. 3 illustrates a more detailed diagram of the generic device driver simulator according to the present invention.

FIG. 3 illustrates a more detailed diagram of the generic device driver simulator 300 according to the present invention. In FIG. 3, the user environment 310 and the kernel environment 320 are illustrated. As mentioned above, the generic device driver 330 is a top half only device driver that executes in the kernel environment 320. The simulator program code for the generic device driver 330 has no knowledge of a specific device so the simulator code is small and easy to maintain. When the real device changes, the simulator program code for the generic device driver 330 does not need to be changed and compiled. Only the database 350 for the device needs to be updated. Updates of the databases 350 are simpler than code updates.

The generic device driver 330 creates response queues 332 for each function of interest based on requests from an interpreter 370. The response queues 332 contain responses, e.g., data and return codes, that are specific to a function. The generic device driver 330 adds responses to the response queues 332 based on requests from the interpreter 370. When an application 380 in the user environment 310 makes a function call to the generic device driver 330, the generic device driver 330 may return the next response, e.g., data and return codes, from the response queue 332 for the function. By default, the generic device driver 330 returns "GOOD" status for each function. For example, the functions may be a tape device 360, a control unit image 362 or an adapter 364. In addition, the response queues 332 may be set up to wait until a signal is received from the interpreter 370 before returning the next response to the application 380.

The watcher 340 is a user environment application that allows a developer of an application 380 to monitor the calls made to a simulated device 360, 362, 364. The watcher 340 displays information each time a watch point is triggered. The watcher may also support the execution of an input file for an interpreter 370 each time a watch point is triggered.

The interpreter 370 is a functioning unit in the user environment 310 that allows the developer of an application 380 to program the generic device driver 330, making its behavior specific to particular devices. The interpreter 370 commands can be placed in a file to form an input script. An input script may be provided for each device function or a single input script may be used to control the behavior of more than one device function. Further, as noted above, an input script is not necessary since the generic device driver will by default return a "GOOD" status.

FIG. 4 illustrates a table 400 for one example of an interpreter command set. Those skilled in the art will recognize that the interpreter command set of FIG. 4 is not meant to be exhaustive, but is presented for illustration only. Other interpreter command sets may be provided in accordance with the present invention.

In FIG. 4, commands 402 are illustrated in a first column and a description 404 for the command is listed in a second column. The PRESET command 410 is a command for setting, listing or clearing preset function responses 412. The EXEC command 420 is a command to execute a command input file 422. The WATCH command 430 is a command for setting, listing or clearing watch points 432. The IF command 440 is a conditional construct 442. The WHILE command 450 is a looping construct 452. The INT command 460 is for declaring and initializing an integer variable 462. The CHAR command 470 is for declaring and initializing a character variable 472. The STRUCT command 480 is for declaring and initializing a structure variable 482. The STATIC command 490 is for declaring static variables 492.

Figure 5:
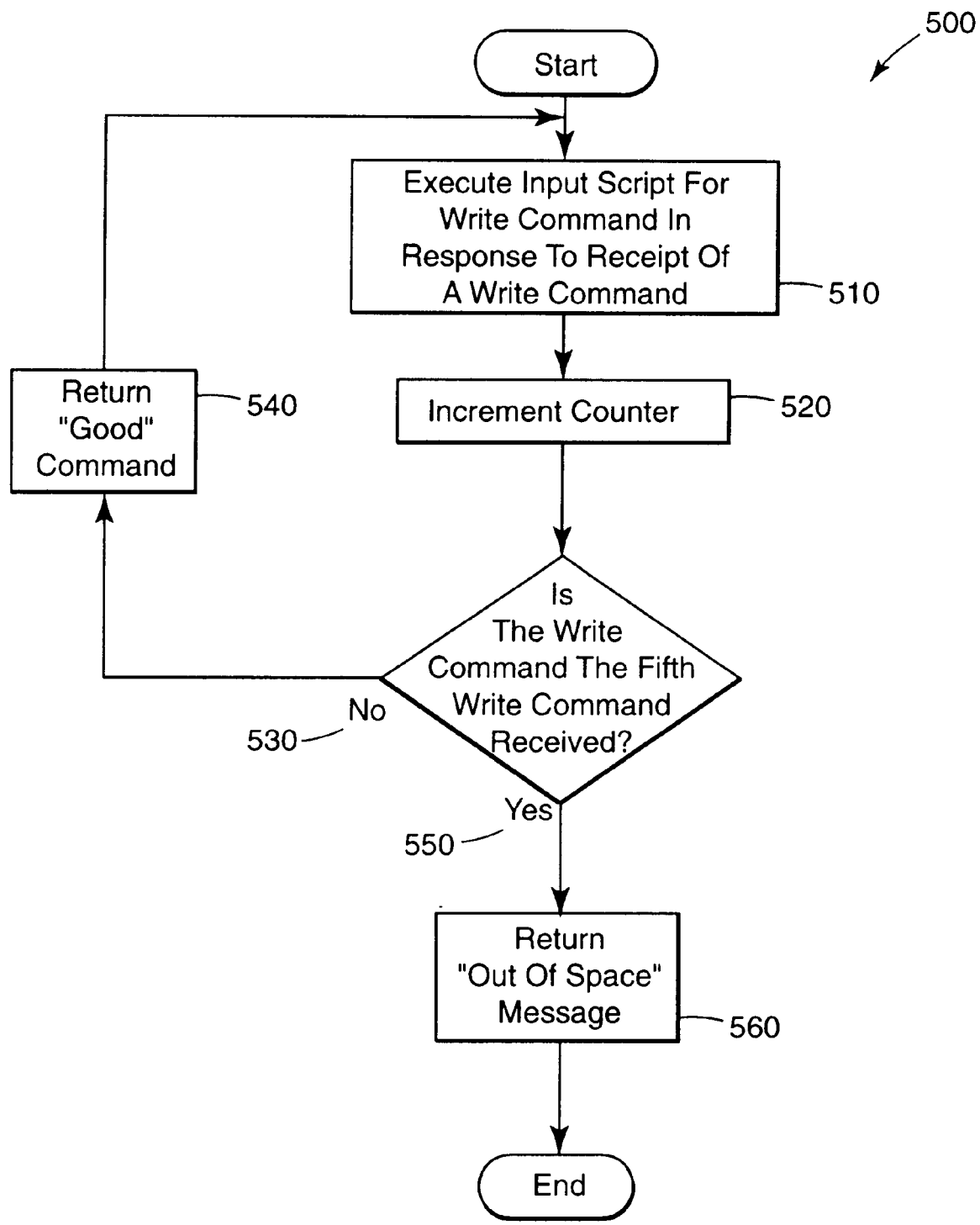
FIG. 5 is a flow chart of one example of an input program script for the interpreter and watcher of FIG. 3.

FIG. 5 is a flow chart 500 of one example of an input program script for the interpreter and watcher of FIG. 3.

Those skilled in the art will readily recognize that the flow chart of the input script 500 is provided for purposes of illustration only, and that other input scripts for other functions or an input script for multiple functions could be written. An input script according to the flow chart may be written for the interpreter and watcher, which may include a single command or several commands grouped to form a program. In FIG. 5, the flow chart of the input script 500 is executed in response to a write function being called 510. If the function is a write, then a WriteCount is incremented 520. If the counter does not indicate that a fifth write command has been detected 530, then the program returns a preset of a "good" return to the application through the generic device driver 540 and the routine recycles. However, on the fifth write 550, an "out of space" error message is returned to the application 560. The "out of space" error message is set using a preset command. All preset commands are used to preset function responses that are returned by the generic device driver to the application. The developer of an application, presets the generic device driver to return specific data and return codes for each function the developer's application uses. Further, the application developer has total control over what values the simulated device returns for return codes and data, and interpreter input scripts can be shared among application developers using the simulator.

Figure 6:
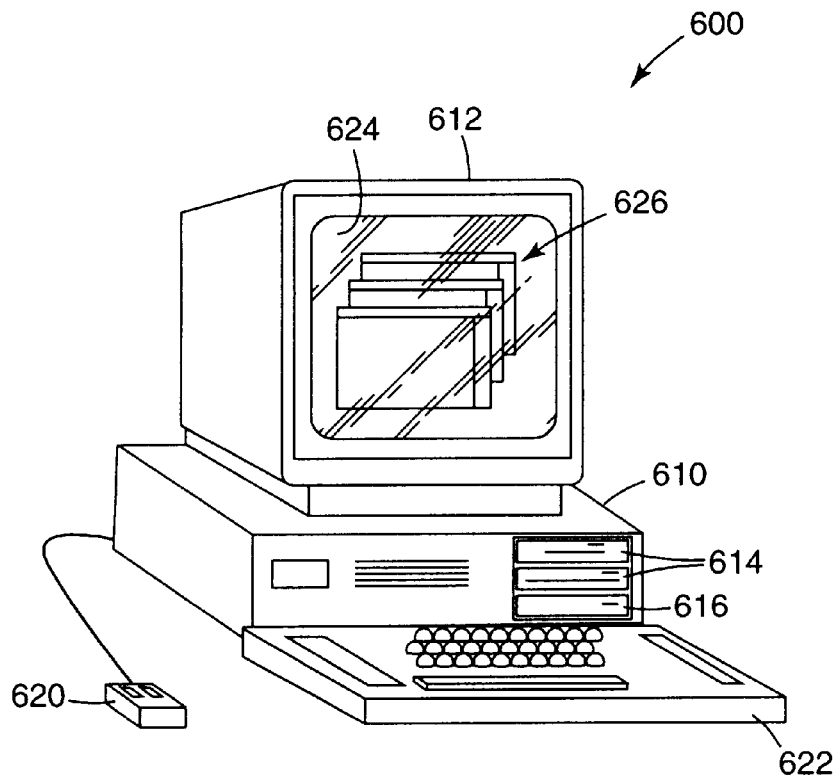
FIG. 6 is a block diagram that illustrates an exemplary hardware environment for providing a generic device driver simulator according to the present invention.

FIG. 6 is a block diagram 600 that illustrates an exemplary hardware environment for providing a generic device driver simulator according to the present invention. The present invention is typically implemented using a computer 610 comprised of a microprocessor, random access memory (RAM), read-only memory (ROM), and other components. It is envisioned that attached to the computer 610 may be a monitor 612, floppy disk drives 614, and CD-ROM drives 616. Also included in the preferred embodiment may be input devices, for example, a mouse pointing device 620 and a keyboard 622.

The computer 610 operates under the control of an operating system 624, such as the Windows, OS/2, Macintosh, or UNIX operating systems, which is represented in FIG. 6 by the screen display on the monitor 612. The computer 610 executes one or more computer programs 626, which are represented in FIG. 6 by the "windows" displayed on the monitor 612, under the control of the operating system 624. The present invention comprises a generic device driver and generic device driver simulator that is preferably implemented in the operating system 624 and/or computer programs 626.

Generally, the operating system 624 and the computer programs 626 may be tangibly embodied in a computer-readable medium or carrier, e.g. one or more of the fixed and/or removable data storage devices 614 and 616, or other data storage or data communications devices. Both the operating system 624 and the computer programs 626 may be loaded from the data storage devices 614 and 616 into the random access memory of the computer 610 for execution by the microprocessor as discussed above with reference to FIG. 6. Both the operating system 624 and the computer programs 626 comprise instructions which, when read and executed by the microprocessor of the computer 610, causes the computer 610 to perform the steps necessary to execute the steps or elements of the present invention.

Although an exemplary computer system configuration is illustrated in FIG. 6, those skilled in the art will recognize that any number of different configurations performing similar functions may be used in accordance with the present invention.

In summary, the present invention provides a generic device driver simulator for aiding in the development of application programs. The generic device driver simulator moves the knowledge of the device specific behavior into a database. An interpreter is used to program the simulator based on the information obtained from the database and a watcher provides a user environment application that allows an application to monitor calls made to a simulated device.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A generic device driver for use in a device driver simulator, the generic device driver supporting application functions without device specific coding included therein and executing in a kernel environment, wherein the generic device driver creates response queues for each function executed by the application.

2. The generic device driver of claim 1 wherein the response queues are specific to a function.

3. The generic device driver of claim 2 wherein the response queues return the next response to the application in response to receipt of a signal from the application.

4. The generic device driver of claim 2 wherein the response queues return the next response to the application in response to receipt of a signal from the interpreter.

5. The generic device driver of claim 1 wherein the response queues return the next response to the application in response to receipt of a signal from the application.

6. A generic device driver simuator, comprising:
   a generic device driver for supporting application functions without device specific coding included therein;
   a database containing device specific models of device drivers supported by the generic device driver; and
   an interpreter, operatively coupled to the generic device driver and the database, for controlling the generic device driver according to the definitions of functions and data structures in the database.

7. The generic device driver simulator of claim 6 further comprising a watcher for defining watchpoints, the watchpoints identifying types of calls from the application.

8. The generic device driver simulator of claim 7 wherein the watcher displays information when a watchpoint is triggered by a call from the application.

9. The generic device driver simulator of claim 8 wherein the interpreter further comprises an input script for each device function supported by the generic device driver.

10. The generic device driver simulator of claim 8 wherein the interpreter further comprises an input script for multiple device functions supported by the generic device driver.

11. The generic device driver simulator of claim 8 wherein the watcher supports the execution of an input script in the interpreter in response to a watchpoint being triggered.

12. The generic device driver simulator of claim 7 wherein the interpreter further comprises an input script for each device function supported by the generic device driver.

13. The generic device driver simulator of claim 12 wherein the watcher supports the execution of an input script in the interpreter in response to a watchpoint being triggered.

14. The generic device driver simulator of claim 6 wherein the device specific models further comprises definitions of functions executed by the application and data structures.

15. The generic device driver simulator of claim 6 further comprising response queues for each function executed by the application.

16. The generic device driver simulator of claim 15 wherein the response queues are specific to a function.

17. The generic device driver simulator of claim 16 wherein the response queues return the next response to the application in response to receipt of a signal from the application.

18. The generic device driver simulator of claim 16 wherein the response queues return the next response to the application in response to receipt of a signal from the interpreter.

19. The generic device driver of claim 15 wherein the response queues return the next response to the application in response to receipt of a signal from the application.

20. The generic device driver simulator of claim 15 wherein the response queues return the next response to the application in response to receipt of a signal from the interpreter.

21. A method of simulating a device driver, comprising the steps of:
   providing a generic device driver in a kernel environment, the generic device driver responding to application calls without device specific coding included in the generic device driver;
   providing a database in a user environment, the database including device specific models of device drivers supported by the generic device driver; and
   controlling the generic device driver through an interpreter in the user environment, the interpreter controlling the generic device driver according to the definitions of functions and data structures in the database.

22. The method of claim 21 further comprising the step of defining watchpoints, the watchpoints identifying types of calls from the application.

23. The method of claim 22 wherein the step of defining watchpoints further comprises the step of displaying information when a watchpoint is triggered by a call from the application.

24. The method of claim 23 wherein the step of controlling the generic device driver through an interpreter further comprises the step of programming the interpreter by writing an input script for each device function supported by the generic device driver.

25. The method of claim 23 wherein the step of controlling the generic device driver through an interpreter further comprises the step of programming the interpreter by writing an input script for multiple device functions supported by the generic device driver.

26. The method of claim 23 wherein the step of defining watchpoints further comprises the step of executing an input script in the interpreter in response to a watchpoint being triggered.

27. The method of claim 21 wherein the device specific models further comprises definitions of functions executed by the application and data structures.

28. The method of claim 21 further comprising response queues for each function executed by the application.

29. The method of claim 28 wherein the response queues are specific to a function.

30. The method of claim 29 wherein the step of responding to application calls further comprises the step of returning the next response to the application in response to receipt of a signal from the application.

31. An article of manufacture for a computer-based user-interface, the article of manufacture comprising a computer readable medium having instructions for causing a computer to perform a method for simulating a device driver, the method:
   providing a generic device driver in a kernel environment, the generic device driver responding to application calls without device specific coding included in the generic device driver;
   providing a database in a user environment, the database including device specific models of device drivers supported by the generic device driver; and
   controlling the generic device driver through an interpreter in the user environment, the interpreter performing according to the definitions of functions and data structures in the database.

32. The article of manufacture of claim 31 further comprising the step of defining watchpoints, the watchpoints identifying types of calls from the application.

33. The article of manufacture of claim 32 wherein the step of defining watchpoints further comprises the step of displaying information when a watchpoint is triggered by a call from the application.

34. The article of manufacture of claim 33 wherein the step of controlling the generic device driver through an interpreter further comprises the step of programming the interpreter by writing an input script for each device function supported by the generic device driver.

35. The article of manufacture of claim 33 wherein the step of controlling the generic device driver through an interpreter further comprises the step of programming the interpreter by writing an input script for multiple device functions supported by the generic device driver.

36. The article of manufacture of claim 33 wherein the step of defining watchpoints further comprises the step of executing an input script in the interpreter in response to a watchpoint being triggered.

37. The article of manufacture of claim 31 wherein the device specific models further comprises definitions of functions executed by the application and data structures.

38. The article of manufacture of claim 31 further comprising response queues for each function executed by the application.

39. The article of manufacture of claim 38 wherein the response queues are specific to a function.

40. The article of manufacture of claim 39 wherein the step of responding to application calls further comprises the step of returning the next response to the application in response to receipt of a signal from the application.

* * * * *